United States Patent
Chen

(10) Patent No.: US 8,998,232 B2
(45) Date of Patent: Apr. 7, 2015

(54) RECUMBANT STYLE POWERED UNICYCLE

(76) Inventor: Shane Chen, Camas, WA (US)

(*) Notice: Subject to any disclaimer, the term of this patent is extended or adjusted under 35 U.S.C. 154(b) by 2 days.

(21) Appl. No.: 13/007,996

(22) Filed: Jan. 17, 2011

(65) Prior Publication Data

US 2011/0175319 A1    Jul. 21, 2011

Related U.S. Application Data

(60) Provisional application No. 61/295,730, filed on Jan. 17, 2010.

(51) Int. Cl.
  *B62K 1/00*  (2006.01)
  *B62J 25/00*  (2006.01)

(52) U.S. Cl.
  CPC .................................... *B62K 1/00* (2013.01)

(58) Field of Classification Search
  USPC ............ 280/205, 291; 297/201, 213, 215.13, 297/215.15
  See application file for complete search history.

(56) References Cited

U.S. PATENT DOCUMENTS

| | | | | |
|---|---|---|---|---|
| 619,204 | A * | 2/1899 | Moore | 297/201 |
| 3,399,742 | A * | 9/1968 | Malick | 180/21 |
| 4,109,741 | A * | 8/1978 | Gabriel | 180/21 |
| 5,314,034 | A * | 5/1994 | Chittal | 180/21 |
| 6,074,002 | A * | 6/2000 | Hansen | 297/201 |
| 6,209,954 | B1 * | 4/2001 | Bombardier | 297/201 |
| 6,290,291 | B1 * | 9/2001 | Kojima | 297/201 |
| 6,302,230 | B1 * | 10/2001 | Kamen et al. | 180/171 |
| 6,488,334 | B1 * | 12/2002 | Geyer et al. | 297/215.13 |
| 8,346,441 | B2 * | 1/2013 | Miki et al. | 701/49 |
| 2007/0262623 | A1 * | 11/2007 | Fortt | 297/215.13 |
| 2008/0054689 | A1 * | 3/2008 | Tucker | 297/201 |
| 2009/0051136 | A1 * | 2/2009 | Yamada et al. | 280/205 |
| 2009/0085320 | A1 * | 4/2009 | Fraser | 280/205 |
| 2009/0102252 | A1 * | 4/2009 | Geyer et al. | 297/215.13 |
| 2011/0056757 | A1 * | 3/2011 | Polutnik | 180/65.51 |
| 2012/0175176 | A1 * | 7/2012 | Hamaya et al. | 180/21 |
| 2014/0058600 | A1 * | 2/2014 | Hoffmann et al. | 701/22 |

* cited by examiner

*Primary Examiner* — Joseph Rocca
*Assistant Examiner* — Marc A Scharich

(57) ABSTRACT

A powered unicycle device for use upon a riding surface. The unicycle device includes a single wheel rotatably coupled to an axle, the wheel extending substantially in a fore-aft direction. A motor for driving the wheel is provided and electronic equipment, in communication with the motor, is configured to maintain fore-aft balance of the unicycle device while being ridden. An elongated curved rail, defining a curved path, is coupled to a support frame of the unicycle device and extends laterally in a side-to-side direction substantially transverse to the fore-aft direction. A seat is disposed above the wheel and is movably coupled to the rail such that the seat is capable of moving laterally along the curved path of the rail, in the side-to-side direction substantially transverse to the fore-aft direction, while the unicycle device is being ridden.

4 Claims, 5 Drawing Sheets

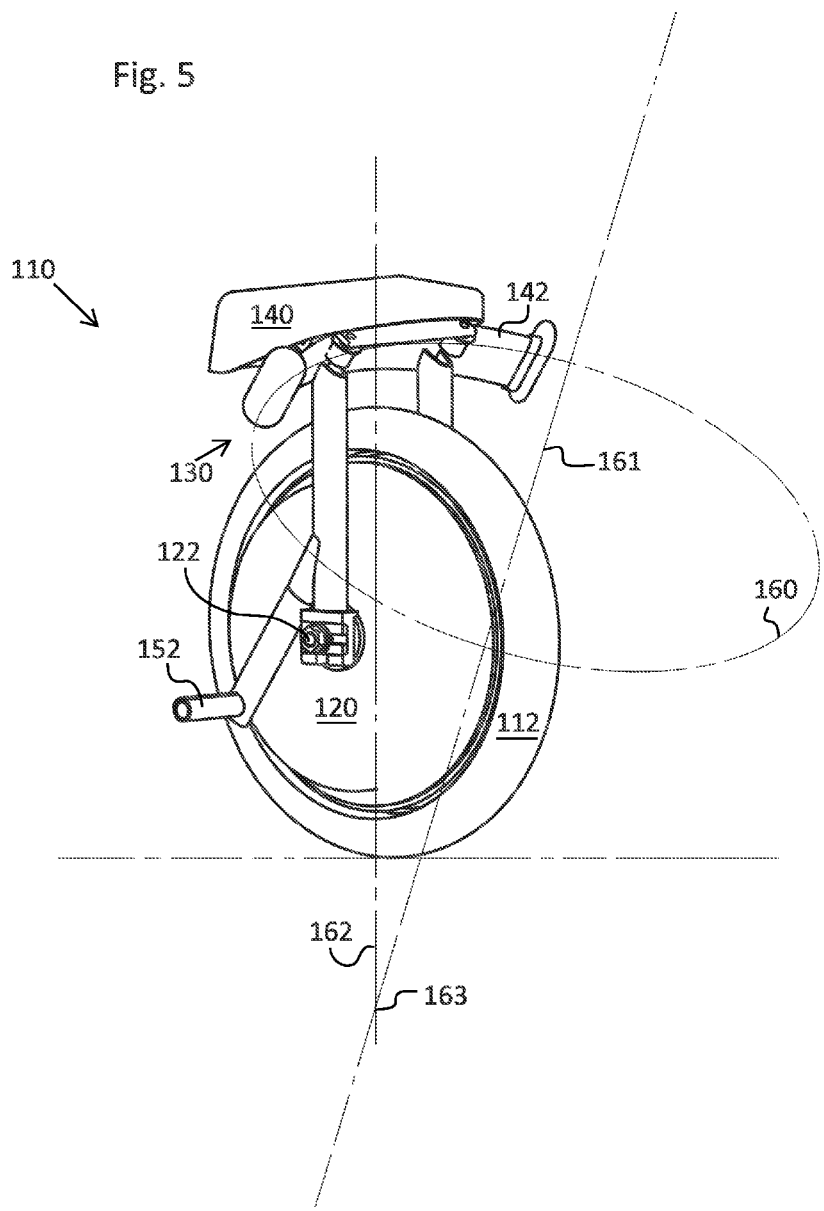

RECUMBANT STYLE POWERED UNICYCLE

CROSS REFERENCE TO RELATED APPLICATION(S)

This application claims the benefit of U.S. Provisional Application No. 61/295,730, filed Jan. 17, 2010, and having the same title and inventor(s) as above.

FIELD OF THE INVENTION

The present invention relates to unicycles and, more specifically, powered unicycles.

BACKGROUND OF THE INVENTION

Unicycles are known in the art and include pedal-operated and powered devices. Powered unicycles include those disclosed in U.S. Pat. No. 6,302,230 issued to Kamen et al. for Personal Mobility Vehicles and Methods (the '230 patent) and U.S. patent application Ser. No. 10/569,152 filed by Alexander for a Powered Unicycle (the '152 application). The '230 patent includes two-wheel and one-wheel embodiments, the two-wheel embodiment including the "Segway", a highly-publicized personal transport device having a user platform between (or above) two parallel wheels.

In a pedal-operated unicycles, fore-aft balance in achieved by the rider pedaling forward or backward to move the wheel under the center of gravity of the device and rider. In a powered unicycle, an electronic gyroscope, that accelerates or decelerates the wheel in the appropriate direction, is used to achieve fore-aft balance. This type of automatic fore-aft balance technology is taught in the '230 patent and the '152 application.

In the devices of both the '230 patent and the '152 application, the steering controls are positioned directly forward of the user, substantially forward of the user's abdomen.

In a unicycle device with forward located steering controls, i.e., a user reaching directly forward to grasp the handle bars as in the '152 application, turning is achieved by the user twisting his/her body relative to the handle bars. To turn the wheel to the right, the user twists their body left and swings the handle bar to the right. If the turn is not far enough, the process is repeated. If the turn is too far, a correcting counter turn is performed—twisting right and swinging the handle bars left. This process of turning and correcting is continued until a desired new line of direction is achieved.

This type of turning is disadvantageously unfamiliar and difficult to most people compared to more familiar techniques. A turning experience with which most people are very familiar is that of riding a bicycle in which, when a turn is executed, one hand moves in a first direction and the other hand moves in substantially the opposite direction. This causes a centrally-located pivot shaft to turn, which in turn moves the wheel. Since most people were taught this style of turning as they grew up riding tricycles and bicycles, it is very familiar to them.

A need exists for a powered unicycle device with a steering arrangement that is similar in feel to a conventional bicycle turning experience, i.e., an arrangement in which one hand moves in a first direction and the other moves in a second direction, contrary to or substantially opposite the first. Among other advantages, this makes the learning process of riding a powered unicycle much quicker (and user-friendly) since a new style of turning need not be learned. This can be achieved, as taught by the present invention, by moving the steering mechanism closer to the center of mass of the user and cycle, for example, in one embodiment, by attaching the steering mechanism below and proximate the seat of a user (directly under and nearer the vertical axis of the center of mass).

Furthermore, in the unicycle of the '152 application and like devices, the user stands (or sits, FIG. 9) in an erect position with his or her body substantially vertical and aligned with the vertical axis of the cycle and rider. This provides a very short radius from the vertical axis to the peripheral mass of the user, providing very little inertial resistance to counter-spinning when attempting to turn. The larger the radius of mass, the more resistance to spinning—similar to a figure skater, the tighter the skater draws in his/her arms, the faster he/she spins).

A result of this smaller radius is a turning experience that involves undesired turning or spinning of a user, left and right, as they attempt to turn. The problem is exacerbated with the multiple turning moves needed to fine tune a turn.

A need exists for a powered unicycle device that provides greater resistance when attempting a turn, thus rendering the unicycle easier to learn and more stable to ride. Through the present invention, this can be achieved by positioning the legs forward, increasing the radius of a user's mass and thereby increasing resistance to counter spinning/turning.

The attainment of these and related advantages and features of the invention should be more readily apparent to those skilled in the art after review of the following more detailed description of the invention taken together with the drawings.

BRIEF DESCRIPTION OF THE DRAWINGS

FIG. 5 is a perspective view of the powered unicycle of FIG. 4 with lines included to illustrate the geometry of the shifting seat.

DETAILED DESCRIPTION

Figure 1:
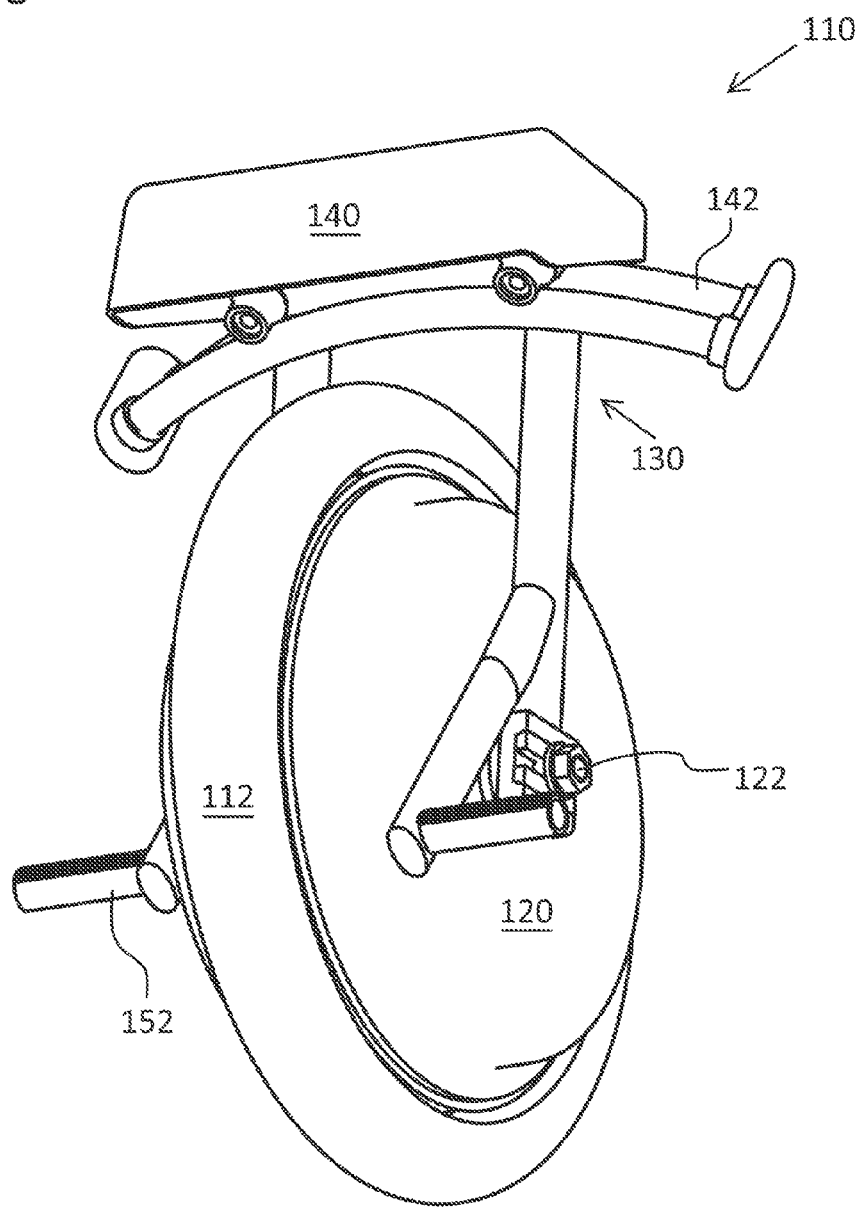
FIG. 1 is a perspective view of an embodiment of a powered unicycle in accordance with the present invention.

Referring to FIG. 1, a perspective view of a powered unicycle 10 in accordance with the present invention is shown. Unicycle 10 may include a wheel 10, coupled through spokes or other members 12, to a hub 20. The hub preferably has an axle 22 that is coupled on both ends to the bottom of forks 32. The forks are part of a wheel support frame 30 and a frame member 34 preferably couples the two forks to one another and holds them in place. Alternatively, the forks 32 may be formed integrally with one another or otherwise formed to converge above the wheel.

A seat 40 and leg extension 50 are preferably mounted onto the support frame 30. The seat and leg extension are preferably fixedly coupled to one another and pivotally coupled to the support frame 30. A pivot shaft ascends from the support from and mounts to the bottom of the seat (this shaft is obscured from view by the seat). The leg extension preferably extends forward of the seat and is preferably connected thereto. Two foot supports 52 may be provided near the end of the leg extension.

A first and a second steering bar 36 (36A, 36B) are preferably mounted to the support frame. In the embodiment of FIG. 1, mounting brackets 35 are fastened to the forks 32 and a steering bar or handle 36 extends laterally (preferably, but not necessarily, more to the side than front) from each fork 32.

The positioning of the feet prominently forward and the coupling of the handle bars under the seat and extending to the side give unicycle 10 the feel of a recumbent cycle.

Figure 2:
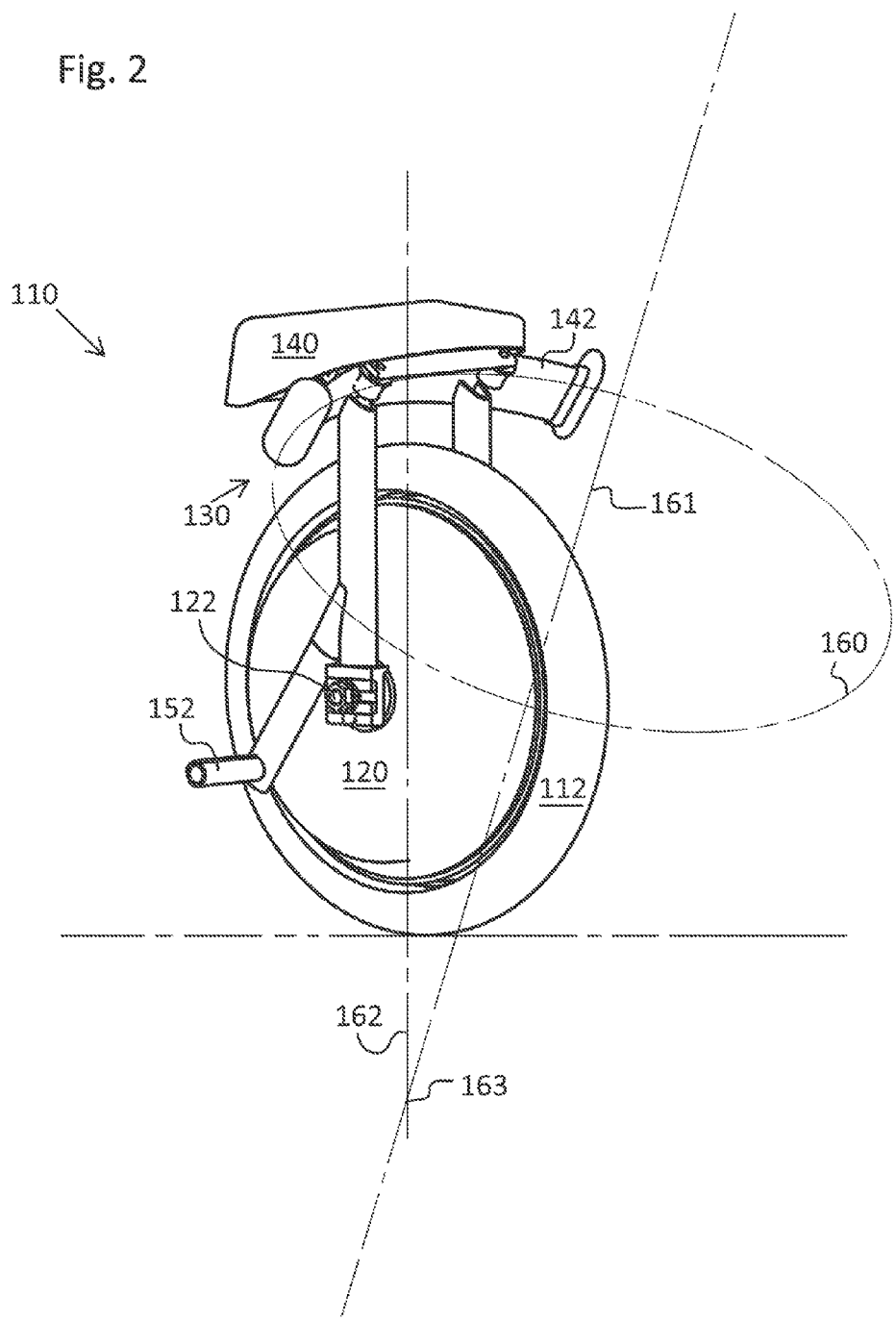
FIG. 2 is a perspective view of the powered unicycle of FIG. 1 with steering handles and foot supports in folded position.

FIG. 2 illustrates device 10 positioned for storage or shipping. The foot supports 52 and the handle bars 37 may be folded to achieve a reduced profile and compact size.

Figure 3:
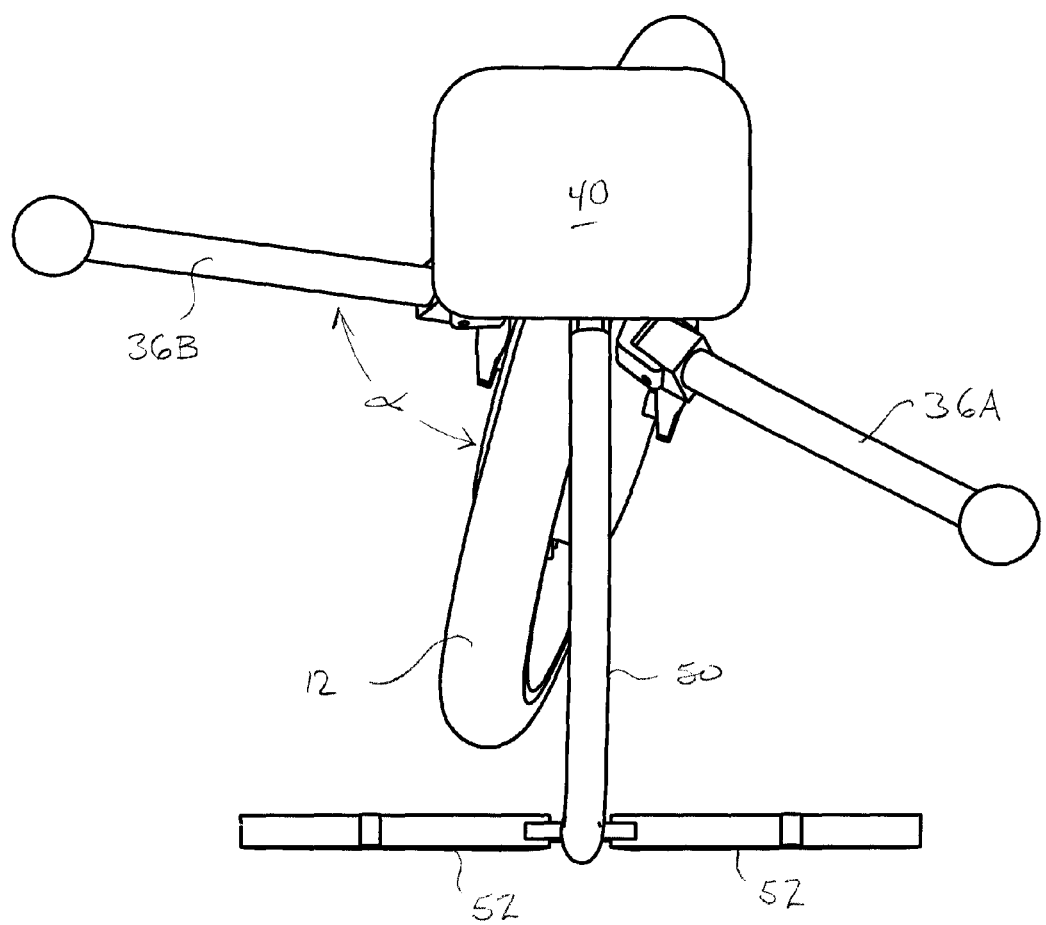
FIG. 3 is a top plan view of the powered unicycle of FIG. 1 with the seat and leg extension pivoted to the left, as during a right turn.

Referring to FIG. 3, a top plan view of unicycle 10 is shown with the seat 40 and leg extension 50 pivoted to the left (relative to the line of direction of the wheel moving forward). This position may occur when a user executes a right turn. A user turns the wheel to the right by moving the left handle bar 36A forward and the right handle bar 36B rearward. Since the point of pivot is under the weight of a user and over the wheel, the wheel readily pivots (turns) in response to the movement of a user's hands in this manner. Thus, turning is achieved in a manner that is familiar to most people.

FIG. 3 also illustrates that in use, the legs extend substantially forward, increasing the radius of the user's body from the vertical axis. This increases resistance to undesired turning/spinning, making operation of device 10 more stable than in prior art embodiments.

Figure 4:
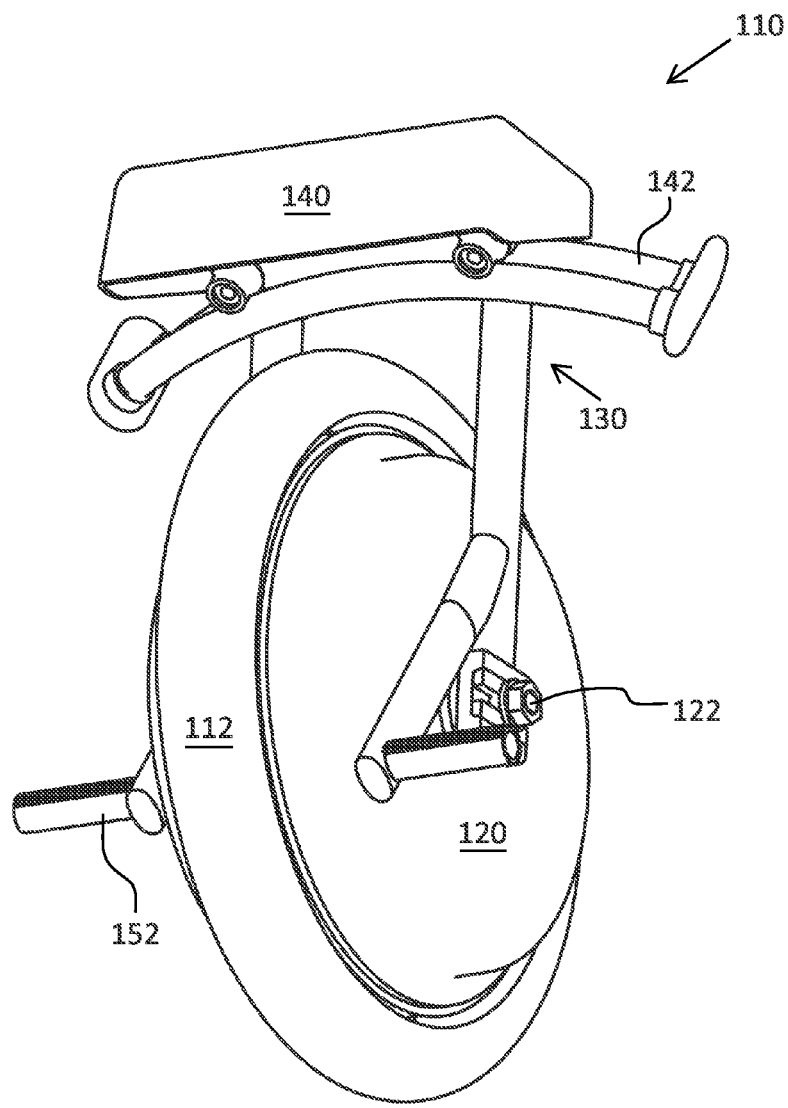
FIG. 4 is a perspective view of another embodiment of a powered unicycle in accordance with the present invention.

Referring to FIGS. 4 and 5, perspective views of another embodiment of a powered unicycle 110 in accordance with the present invention is shown. Unicycle 110 includes wheel 112, axle 122, and wheel support frame 130, in the same configuration as that of unicycle 10 in FIGS. 1-3. A seat 140 is supported by, and coupled to, a rail 142, which is mounted onto the wheel support frame 130 and disposed substantially transverse to the direction of forward travel. The rail 142 and seat 140 are configured such that the seat 140 may slide along the length of the rail 142, thereby undergoing a change in position relative to the wheel 112. In this embodiment the rail 142 is curved downward and to the rear and forms an arc of a circle 160. The seat 140 slides upon the curved rail 142, moving around an axis 161 extending perpendicularly from the center of the circle 160. In this embodiment a vertical line 162, passing through axle 122, intersects axis 161 at a point 163 below the ground or riding surface.

As with the unicycle 10 of FIGS. 1-3, the unicycle 110 may have foot support member(s) 152 upon which a user rests his or her feet. During non-turning forward travel, the plane of the wheel 112 is generally vertical, and the seat 140 remains generally directly above the wheel. A right turn is initiated by pressing on the right foot support, in reaction to which the wheel 112 and wheel support flame 130 tilt to the right, resulting in turning. The rail 142 tilts to the right along with the wheel support flame 130, while the seat 140 slides leftward on rail 142, thereby avoiding tilting and allowing the user to remain sitting upright. This configuration renders the unicycle 110 much easier to operate than traditionally constructed unicycles wherein the seat is immovably attached.

The device 110 may further comprise steering bars such as those of FIGS. 1-3; however, this embodiment of the device is capable of being steered without hand-operated steering bars and they are not included in FIGS. 4 and 5.

Fore-aft balance is attained by providing a sensor and the electronic gyroscope equipment (known in the art as mentioned above). The sensor and gyroscope equipment may be provided in seat 40, 140 or directly in hub 20, 120. Position information detected by the sensor is relayed to a motor and drive mechanism in the hub 20, 120. In response to the position information, the motor and drive mechanism move axle 22, 122 in the appropriate direction and at sufficient speed to maintain fore-aft balance. Suitable motorized hubs and sensor connections are known in the art. Communication between sensor, gyroscope equipment and drive mechanism may be wired or wireless.

Referring to FIG. 3, it can be seen that the steering bars 36A, 36B extend radially from wheel 12 at an angle, $\alpha$, that is approximately 70-80 degrees from a vertical plane through wheel 12. In a preferred embodiment, a is approximately 45 degrees or more and more preferably 60 degrees or more. While $\alpha$ may be less than 45 degrees without departing from the present invention, $\alpha$ is preferably between 45 and 135 degrees.

Referring to FIG. 1, foot supports 52 are located forward of wheel 12 and substantially forward of axle 22. Referring to FIGS. 4 and 5, the foot supports 152 are located between axle 122 and the outer edge of wheel 112. The foot supports 152 are preferably positioned at at least 30% of the distance from the axle to the outer edge of the wheel and more preferably at approximately 50% or more (e.g., 60%, 70&, etc.) of the distance from axle 122 to the outer edge of wheel 112. Placing the foot supports forward of and spaced from the axle provides an extension of mass (the user's legs) outwardly from the vertical pivot of the wheel and thereby provides desired resistance when executing a turn.

In both unicycle 10 and unicycle 110 (and any other embodiment of the present invention), a means may be included to bias the seat toward a central, forward-facing position, such that the device tends to automatically return to a non-turning position.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A powered unicycle device for use upon a riding surface, comprising:
    a support frame;
    an axle engaged with the support frame;
    a single wheel rotatably coupled to the axle, the wheel extending substantially in a fore-aft direction in which the unicycle device travels;
    a motor for driving the wheel;
    electronic equipment, in communication with the motor, configured to maintain fore-aft balance of the unicycle device while being ridden;
    an elongated curved rail coupled to the support frame and extending laterally in a side-to-side direction substantially transverse to the fore-aft direction, the rail having a curved portion defining a curved path of the rail, the curved portion extending contiguously from a first lateral end of the rail to a second lateral end of the rail and curved downwardly and rearwardly in the fore-aft direction; and
    a seat disposed above the wheel and movably coupled to the rail, the seat capable of moving laterally along the curved path of the rail, in the side-to-side direction substantially transverse to the fore-aft direction, while the unicycle device is being ridden.

2. The unicycle device of claim 1, wherein the curved path of the rail is a section of an imaginary circle having a center axis passing through a center of the circle, wherein the seat moves along the curved path about the center axis of the circle.

3. The unicycle device of claim 2, wherein a vertical line which passes through the axle intersects the center axis of the circle at a point beneath the wheel.

4. The unicycle device of claim 1, further comprising at least one foot support member, wherein the at least one foot support member is positioned forward of the axle and is spaced therefrom at a distance of at least 30% or more of a distance from the axle to an outer edge of the wheel.

* * * * *